United States Patent
Alexander et al.

(10) Patent No.: US 7,454,479 B2
(45) Date of Patent: Nov. 18, 2008

(54) FLEXIBLE TELEPORT ARCHITECTURE

(75) Inventors: Zubin Alexander, Kirkland, WA (US); David Cain, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 942 days.

(21) Appl. No.: 10/857,665

(22) Filed: May 28, 2004

(65) Prior Publication Data

US 2006/0041635 A1 Feb. 23, 2006

(51) Int. Cl.
G06F 15/16 (2006.01)
(52) U.S. Cl. .............. 709/217; 709/203; 709/218; 709/219; 709/226; 709/238; 709/245
(58) Field of Classification Search ............ 709/203, 709/217, 219, 226, 238, 245, 218
See application file for complete search history.

(56) References Cited

U.S. PATENT DOCUMENTS

| | | | | |
|---|---|---|---|---|
| 6,360,262 | B1* | 3/2002 | Guenthner et al. | 709/226 |
| 6,965,912 | B2* | 11/2005 | Friedman et al. | 709/203 |
| 2002/0199014 | A1* | 12/2002 | Yang et al. | 709/238 |
| 2003/0208556 | A1* | 11/2003 | Friedman et al. | 709/218 |
| 2005/0021857 | A1* | 1/2005 | Balassanian | 709/245 |
| 2006/0090007 | A1* | 4/2006 | Tonouchi | 709/245 |

OTHER PUBLICATIONS

Kindberg, Tim, "Implementing Physical Hyperlinks Using Ubiquitous Identifier Resolution," Copyright Hewlett-Packard Company 2002, 11 pages.
Ashman, Helen, "Electronic Document Addressing: Dealing with Change," ACM Computing Surveys, vol. 32, No. 3, Sep. 2000, pp. 201-212.
Alexandrov, Albert D., et al., "Ufo: A Personal Global File System Based on User-Level Extensions to the Operating System," ACM Transactions on Computer Systems, vol. 16, No. 3, Aug. 1998, pp. 207-233.

* cited by examiner

*Primary Examiner*—Liangche A Wang
(74) *Attorney, Agent, or Firm*—Perkins Coie LLP (57) ABSTRACT

A system and corresponding methods for mapping a teleport URL to a destination URL are provided. In one embodiment, a system for redirecting a teleport URL includes a storage unit configured to store a plurality of teleport entries, where each of the teleport entries is capable of being identified by a plurality of attributes, and where each of the plurality of teleport entries has zero, one or more parameter directives. The system also includes a module coupled to the storage unit and operable to process a plurality of teleport URLs. The module is also operable to identify one of the plurality of teleport entries that is appropriate for processing a teleport URL, and utilizes the identified one of the plurality of teleport entries to generate a destination URL that corresponds to the teleport URL.

15 Claims, 7 Drawing Sheets

FLEXIBLE TELEPORT ARCHITECTURE

TECHNICAL FIELD

The described technology is directed to locating resources on the Internet and, more particularly, redirecting uniform resource locators ("URLs").

BACKGROUND

Because the worldwide web ("web") provides an enormous distributed database of information interconnected by the Internet, many CD/DVD products, such as, for example, Encarta®, include hyperlinks that link to information on the web. A hyperlink is a URL, which is a formatted string that identifies a particular resource, such as a web page, on the web. The URLs in these products are typically hard-coded.

These URLs are used to provide links from an installation of the CD/DVD product on a client computer to appropriate Internet locations, which include the additional information. The client computer sends the URL to a network server specified by a portion of the URL, and a web site rendering engine on the network server responds by sending the requested resource (e.g., a web page) to the client computer.

Once the CD/DVD product containing the URLs is shipped to retail stores, and eventually to customers, the hard-coded URLs can never be changed. This presents a major problem because there are many situations when a URL may need to be changed. For example, a URL may need to be changed when the web resource has moved to a different location, when the web resource has changed its parameter requirements, at the end of a product's life cycle, at the end of a feature's life, to improve the user experience, and the like. The problem is compounded when a URL references a resource that is not under the control of the developer of the CD/DVD product. In such a case, the party who controls the resource can arbitrarily take steps that would render the URL invalid.

Because hard-coded URLs can not be changed, a client computer that attempts to access a resource through an invalid URL would detect an error. To prevent these errors from occurring, developers of a CD/DVD product would set each URL to identify a known resource on a known server that is controlled by the developer. When a request for a resource identified by a URL is received at the server, the server could redirect the client computer to retrieve the resource from another location or server. Such redirected URLs are referred to as "teleport" URLs. To correctly process both valid and invalid teleport URLs on the server, each teleport URL has a corresponding active server page ("asp") file or server side executable or server side script extension. Each asp file or server side executable or server side script extension is basically a script that translates the input teleport URL to a corresponding destination URL. The web site rendering engine can then redirect the user to the resource addressed by the destination URL (i.e., the correct destination).

A major drawback with using a corresponding asp file or server side executable or server side script extension for each teleport URL is the difficulty in maintaining the potentially large number of asp or server side executable or server side script extension files. For example, when a teleport URL changes, the change needs to be applied to its related asp file or server side executable or server side script extension. Accordingly, changes related to a large number of teleport URLs need to be applied to all related asp files or server side executables or server side script extensions. Even if it is the same change, the change needs to be applied to all asp files or server side executables or server side script extensions because, presently, there is no way for a group of teleport URLs to be updated. Applying the changes to the asp files or server side executables or server side script extensions becomes more complicated when some processing logic needs to be shared across asp files or server side executables or server side script extensions on an ongoing basis. Thus, a change could involve hundreds of asp files or server side executables or server side script extensions, and this is a very inefficient method of handling changes to teleport URLs. Moreover, changes to asp files or server side executables or server side script extensions need to be made by programmers whose services may be in short supply and expensive.

Accordingly, a teleport URL handling architecture that efficiently and flexibly handles changes to teleport URLs will have significant utility.

SUMMARY

In one embodiment, a server utilizes a single module to process all teleport URLs received by the server. The single module uses a mapping of teleport URLs to teleport mapping data and directives to generate a destination URL string that corresponds to an input teleport URL string. Each teleport URL identifies the module and includes parameters, which the module uses to identify the appropriate mapping data and directives. For example, the module identifies the teleport mapping data and directives that correspond to the input teleport URL, and uses the mapping data and directives to construct the destination URL for the input teleport URL.

In another embodiment, the module supports the use of domain name aliases in the teleport mapping data. A mapping of full domain names and their aliases are provided in, by way of example and not limitation, a file or a database, and when an alias is present in a mapping data, the resource replaces the alias with its corresponding full domain name. For example, "MSNBC" might be an alias for the full domain name "www.msnbc.com." Providing a mapping of aliases to full domain names increases flexibility in that teleport URLs can easily be directed to different domains by simply changing the domain name in the alias mapping.

In still another embodiment, a URL provides a language and/or culture designation for use by a server in serving web content. For example, a program executing on a client computer can append a language and/or culture designation to a URL before sending the URL to a server for processing. The server can then use the language and/or culture designation to determine what resource to return to the client computer. For example, the server can use the additional information in order to send the requested resource in an appropriate language. The server can also take some action based on the language and/or culture designation contained in the URL, such as, by way of example and not limitation, send advertisements that are appropriate for the designated language and/or culture.

These and other aspects, features, and advantages of the described technology will be set forth in the description that follows and possible embodiments thereof, and by reference to the appended drawings, the described technology not being limited to any particular embodiment(s) thereof.

DETAILED DESCRIPTION

A system and corresponding methods for mapping a teleport URL to a destination URL are provided. In one embodiment, a single resource on a server processes all teleport URLs addressed to the server. The single resource uses a mapping of teleport URLs to teleport mapping data and directives to generate a destination URL string that corresponds to an input teleport URL string. Each teleport URL identifies the resource and includes parameters, which the resource uses to identify the appropriate mapping data and directives. For example, the resource identifies the teleport mapping data and directives that correspond to the input teleport URL, and uses the mapping data and directives to construct the destination URL for the input teleport URL.

In another embodiment, the resource supports the use of aliases for full domain names in the teleport mapping data. A mapping of full domain names and their aliases are provided in, by way of example and not limitation, a file or a database, and when an alias is present in a mapping data, the resource replaces the alias with its corresponding full domain name. For example, "MSNBC" might be an alias for the full domain name "www.msnbc.com." Providing a mapping of aliases to full domain names increases flexibility in that teleport URLs can easily be directed to different domains by simply changing the domain name in the alias mapping.

In still another embodiment, a URL provides a language and/or culture designation, which is used by a server in serving web content. For example, a program executing on a client computer can append a language and/or culture designation to a URL before sending the URL to a server for processing. The server can then use the language and/or culture designation in determining what resource to send to or how to redirect the client computer. For example, the server can use the additional information in order to send the requested resource in an appropriate language. The server can also take some action based on the language and/or culture designation contained in the URL, such as, by way of example and not limitation, send advertisements that are appropriate for the designated language and/or culture.

The various embodiments of the teleport architecture and their advantages are best understood by referring to FIGS. 1 through 9 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
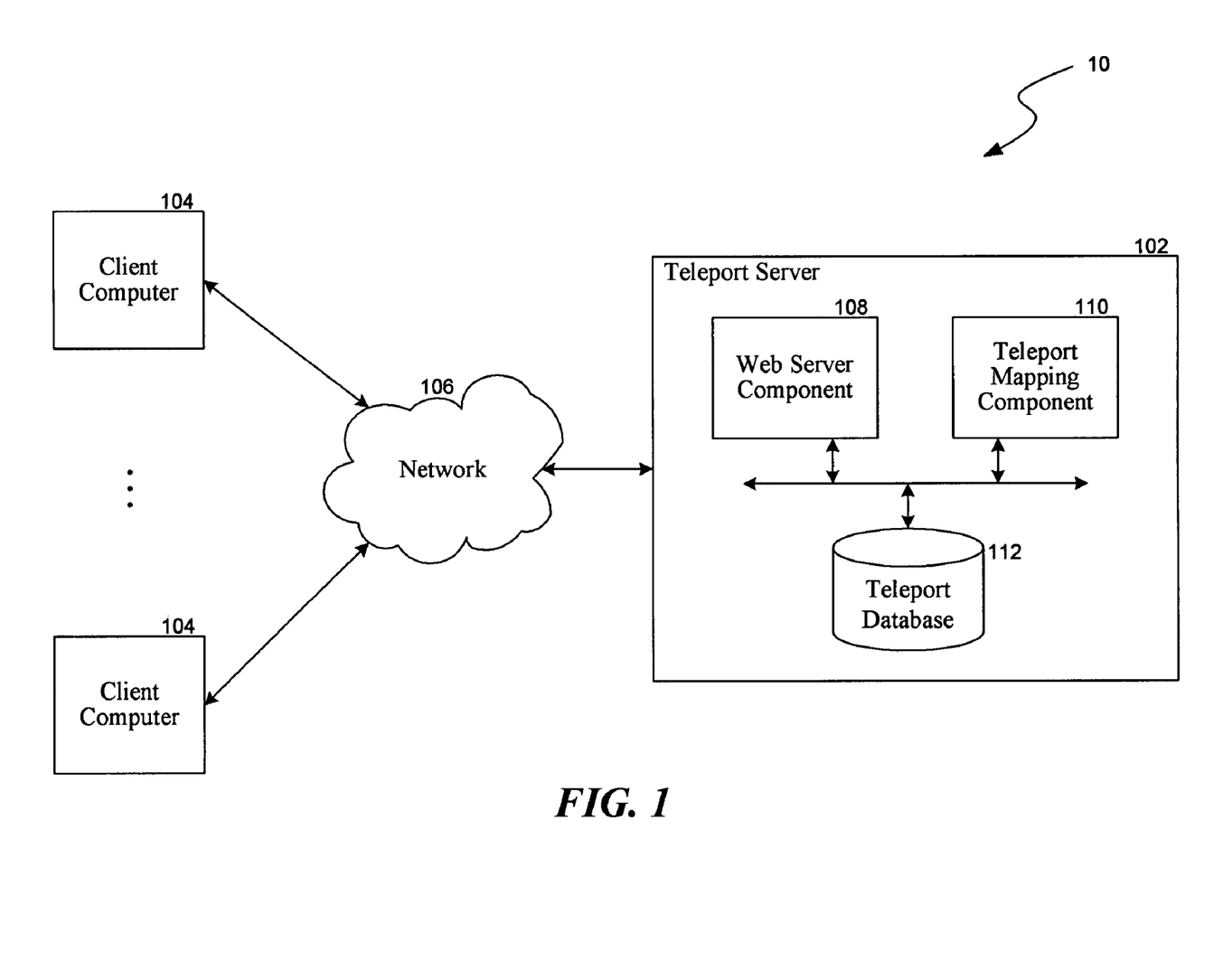
FIG. 1 is a block diagram illustrating an exemplary environment in which a teleport server may operate.

FIG. 1 is a block diagram illustrating an exemplary embodiment 10 in which a teleport server 102 may operate. As depicted, environment 10 includes teleport server 102 coupled to one or more client computers 104. In particular, teleport server 102 and client computers 104 are coupled through a network 106. As used herein, the terms "connected," "coupled," or any variant thereof, means any connection or coupling, either direct or indirect, between two or more elements; the coupling of connection between the elements can be physical, logical, or a combination thereof.

In general terms, teleport server 102 provides a software facility for managing and maintaining the behavior of internet links received from fixed-media and other external sources. In one embodiment, teleport server 102 facilitates the translation and/or transformation of teleport URLs to corresponding destination URLs using teleport mapping data and directives, as further discussed below.

Client computer 104 may be any type of computer that provides a user the ability to load and execute software programs and the ability to access a network, such as, for example, network 106. In one embodiment, client computer 104 is a personal computer running a suitable operating system program that supports the loading and executing of application programs, including fixed media products, and communicating to other remote computers and communication devices through network 106. Client computer 104 may include a web client program, such as a web browser, for browsing the web.

For example, a user on client computer 104 can execute a software program that provides teleport URLs, and activate a teleport URL, causing client computer 104 to transmit the teleport URL to an addressed recipient. The teleport URLs are typically provided on fixed-media products, such as, by way of example and not limitation, products, including programs and data, delivered on CDs and/or DVDs. In another example, a user on client computer 104 can execute the web browser to view web resources, such as web pages and web sites, provided on various computers coupled to network 106. The web browser enables its user to specify the address or URL of a desired web resource, and transmits the specified address or URL to obtain the addressed web resource.

It will be appreciated that the teleport URL is not confined to fixed-media products. For example, a user can specify a teleport URL in the "address" bar provided on a web browser. A software program can also include and transmit teleport URLs. Conversely, regular URLs and internet links may be provided in and generated by fixed-media products.

Network 104 is a communications link that facilitates the transfer of electronic content between, for example, the attached computers. In one embodiment, network 104 includes the Internet. It will be appreciated that network 104 may be comprised of one or more other types of networks, such as a local area network, a wide area network, a point-to-point dial-up connection, and the like.

The computer systems of teleport server 102 and client computer 104 may include a central processing unit, memory, input devices (e.g., keyboard and pointing devices), output devices (e.g., display devices), and storage devices (e.g., disk drives). The memory and storage devices are computer-readable media that may contain instructions that implement the facility.

Environment 10 is only one example of a suitable operating environment and is not intended to suggest any limitation as to the scope of use or functionality of the software functionality of teleport server 102. Other well-known computing systems, environments, and configurations that may be suitable for use include client computers, server computers, hand-held or laptop devices, multiprocessor systems, microprocessor-based systems, programmable consumer electronics, network PCs, minicomputers, mainframe computers, distributed computing environments including any of the above systems or devices, and the like.

The software facility of teleport server 102 may be described in the general context of computer-readable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

As depicted in FIG. 1, teleport server 102 is comprised of a web server component 108, a teleport mapping component 110 and a teleport database 112. It will be appreciated that teleport server 102 includes other components, in addition to components 108, 110 and database 112, which are typically found on a computer suitable for functioning as teleport server 102 as described herein. For example, teleport server 102 also includes a processing unit, memory, network interface, input/output interface and devices, and the like.

Web server component 108 generally functions as a web server for delivering web resources in response to requests from web clients. In one embodiment, web server component 108 is implemented using Microsoft's Internet Information Services (IIS), which provides a powerful web application infrastructure. Web server component 108 receives a request, typically in the form of a URL, for a web resource and determines whether the request is a teleport URL. If the request is a teleport URL, web server component 108 passes the teleport URL to teleport mapping component 110, which processes the teleport URL and returns a destination URL. Web server component 108 then redirects the web client to the destination URL. Otherwise, if the request is not a teleport URL, web server component 108 delivers the web resource addressed by the request to the web client.

Teleport mapping component 110 receives as input a teleport URL string and translates and/or transforms the teleport URL string to a destination URL string. In particular, teleport mapping component 110 identifies the teleport mapping data and directives that correspond to the input teleport URL string and uses the identified teleport mapping data and directives to generate a destination URL string. In one embodiment, teleport mapping component 110 is a single resource, such as, by way of example and not limitation, a file, a program, and the like, which processes all the teleport URLs received by teleport server 102. For example, teleport server 102 may be implemented as an .asp or .aspx file or server side executable or server side script extension.

Teleport database 112 provides a repository for the teleport mapping data and directives used by teleport mapping component 110 to generate the destination URL strings. In one embodiment, teleport database 112 is implemented with software written in Structured Query Language (SQL). SQL is a relational database language standard defined by the International Standards Organization (ISO). Teleport database 112 can be implemented utilizing any number of commercially available products such as Microsoft Access®, and the like. In other embodiments, teleport database 112 may be a database that conforms to a database standard other than SQL such as XML (extensible markup language) residing either in a file or a database, or even implemented using a file system provided on teleport server 102.

The aforementioned components of teleport server 102 are only illustrative, and teleport server 102 may include other components and modules not depicted. The depicted components and modules may communicate with each other and other components comprising teleport server 102 through mechanisms such as, by way of example, interprocess communication, procedure and function calls, application program interfaces, other various program interfaces, and various network protocols. Furthermore, the functionality provided for in the components, modules and databases may be combined into fewer components, modules or databases or further separated into additional components, modules or databases.

In one embodiment, teleport server 102, including its components, may be implemented as a web server component. In another embodiment, teleport server 102, including its components, may be implemented as an extension to a web server (e.g., an integral portion of a web server).

Figure 2:
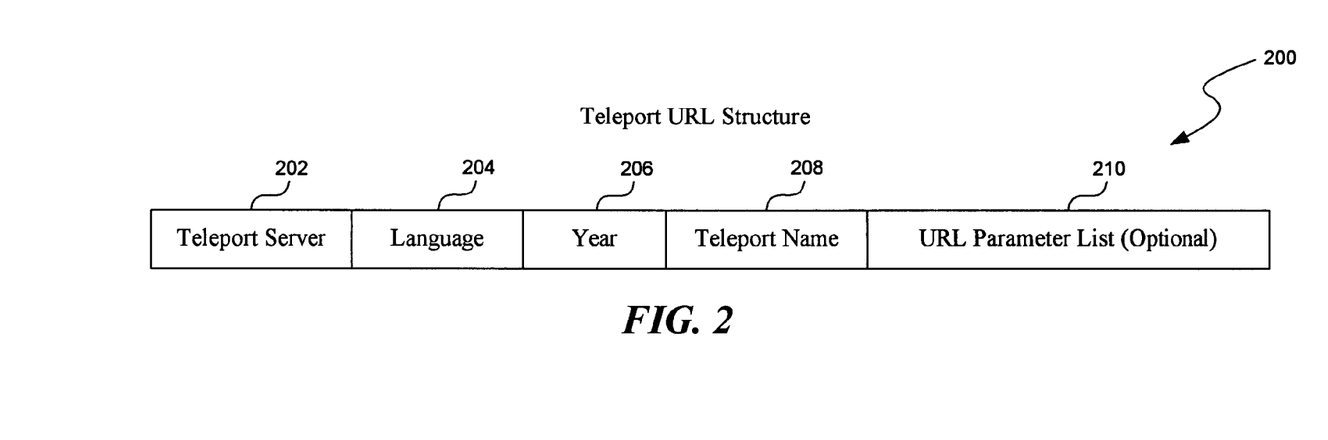
FIG. 2 illustrates an exemplary teleport URL structure, according to one embodiment.

FIG. 2 illustrates an exemplary teleport URL structure 200, according to one embodiment. In particular, teleport URL structure 200 defines the structure of a teleport URL that is used to connect to teleport server 102. By way of example, teleport URL structure 200 is illustrated as comprising a teleport server attribute 202, a language attribute 204, a year attribute 206, a teleport name attribute 208, and an optional URL parameter list 210.

Teleport server attribute 202 specifies the domain and the relative file path and/or file name of a destination resource, for example, a resource capable of processing the teleport URL. For example, teleport server attribute 202 of a teleport URL addressed to teleport server 102 includes the domain and the relative file path and file name of web server component 108 and the teleport mapping component 110, respectively.

Language attribute 204 specifies a language. For example, the language might be the language used by the product or program that generated the teleport URL. In one embodiment, the language is specified using the generally known single character language code, "A," "B," "C," "D," "E," "F," "I," "J," "N," "S," and "Z," which identifies a unique language. Year attribute 206 specifies the year, for example, of the product or program that generated the teleport URL. In one embodiment, the year is specified as a four-digit decimal number in the YYYY format (e.g., 2004).

Teleport name attribute 208 specifies the name of a teleport and generally serves as a friendly identifier (ID). For example, teleport name attribute 208 may be used as one element in identifying a teleport entry that contains the teleport mapping data and directives corresponding to a teleport URL. URL parameter list 210, when present, specifies a list of parameters and their corresponding values in standard URL fashion.

By way of example, in an exemplary teleport URL "http://domainname.com/teleport/teleport.aspx?Lang=A&Year=2004&tname=telurl&param1=45&param3=35&param5=56":

teleport server attribute 202 is designated by the string "domainname.com/teleport/teleport.aspx" and specifies "domainname.com" as the domain, and "/teleport/teleport.aspx" as the path;

language attribute 204 is designated by the string "Lang=" and specifies "A" as the single character language code;

year attribute 206 is designated by the string "Year=" and specifies "2004" as the year;

teleport name attribute 208 is designated by the string "tname=" and specifies "telurl" as the teleport name; and URL parameter list 210 is the list of parameters where the string "param1" is the name of the first parameter and is followed by its value "45," the string "param3" is the name of the second parameter and is followed by its value "35," and the string "param5" is the name of the third parameter and is followed by its value "56."

In one embodiment, a teleport URL is either a simple redirect teleport, a constructed redirect teleport or a complex redirect teleport. A simple redirect teleport simply redirects to a destination URL. In a constructed redirect teleport, the parameters in an input teleport URL are mapped to parameters in the destination URL and/or additional static variables, which were not present in the input teleport URL, are added to the destination URL. For example, static variables may need to be added if the destination resource requires the use of the static variables, and these variables are not present in the input teleport URL.

In a complex redirect teleport, a destination URL for an input teleport URL may not be known until additional processing is performed. The logic to construct a destination URL from an input teleport URL is complex enough to have a general solution. In one embodiment, a separate resource on teleport server 102, such as a custom .aspx file or server side executable or server side script extension, may be provided to perform the complex redirect of an input teleport URL to a destination URL.

A parameter in a constructed redirect or a complex redirect teleport URL is either mapped to a different parameter name and the parameter value is maintained, mapped to a different parameter name and the parameter value is overridden, maintained (name is kept the same) and the parameter value is overridden, or dropped (i.e., not used in the destination URL). Additionally, additional parameters not present in the teleport URL may be appended to the destination URL.

Figure 3:
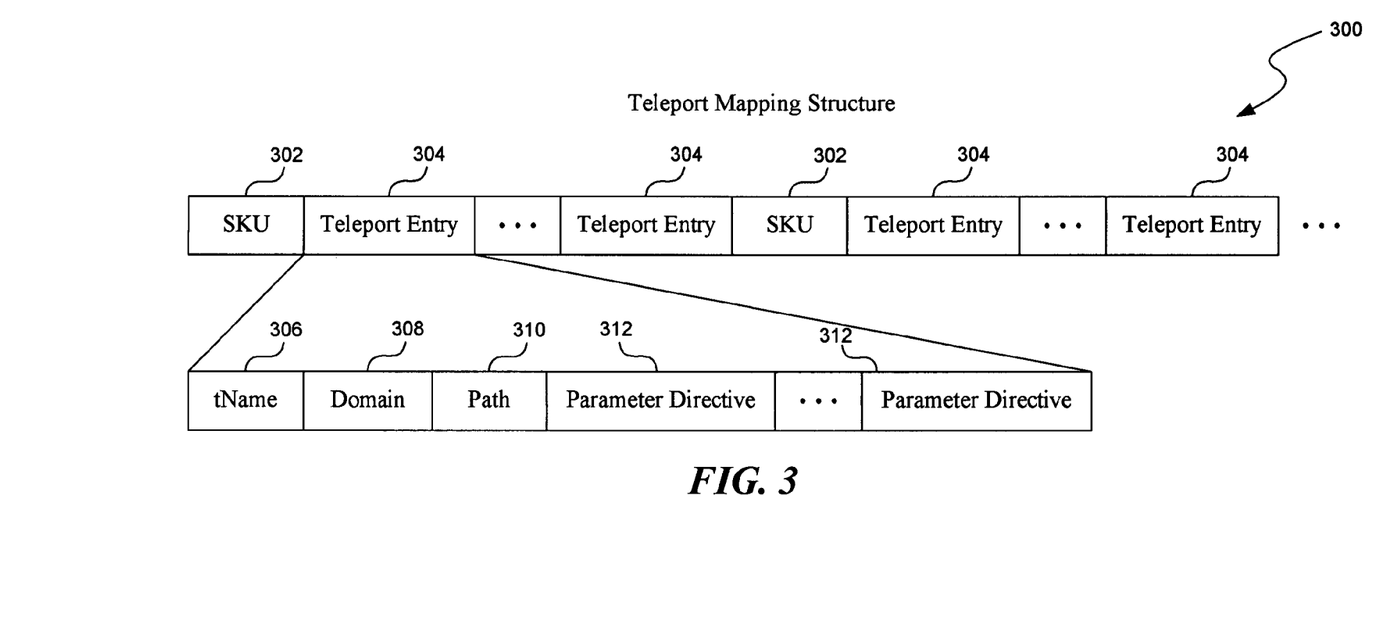
FIG. 3 illustrates an exemplary teleport mapping structure, according to one embodiment.

FIG. 3 illustrates an exemplary teleport mapping structure 300, according to one embodiment. In particular, teleport mapping structure 300 defines the structure of the teleport entries, including the teleport mapping data and directives, which correspond to the teleport URLs, and which is used to generate the destination URL strings. In one embodiment, teleport mapping structure 300 is developed using Extensible Markup Language (XML), and is predicated on the concept of parsing an input teleport URL and translating based on the parameter directives (i.e., teleport mapping data and directives) in the XML corresponding to the teleport entry for the input teleport URL.

By way of example, teleport mapping structure 300 is illustrated as comprising one or more SKU components 302, and one or more teleport entry components 304 following each one of SKU components 302. SKU component 302 functions as a container that holds one or more teleport entry components 304. Stated differently, each SKU component 302 identifies one or more teleport entries by grouping the teleport entries together. In one embodiment, SKU component 302 is specified by a language designation and a year designation.

Teleport entry component 304 specifies a teleport entry, including the teleport mapping data and directives, which is used to generate a destination URL string from an input teleport URL. At most one teleport entry corresponds to an input teleport URL. The teleport entry for an input teleport URL can be identified by the teleport name (tname), year and language parameters specified in the teleport URL.

By way of example, teleport entry component 304 is illustrated as comprising a tName attribute 306, a domain attribute 308, a path attribute 310, and one or more parameter directives 312. tName attribute 306 identifies the teleport entry (i.e., teleport entry component 304) by the name specified by the tName attribute 306. Domain attribute 308 specifies a destination domain. Path attribute 310 specifies a relative file path and/or filename. Parameter directive 312 specifies a rule for mapping an input parameter to an output parameter or creating a new output parameter.

An exemplary teleport mapping structure 300 for the aforementioned exemplary teleport URL "http://domainname.com/teport/teleport.aspx?Lang=A&Year=2004&tname=telurl&param1=45&param3=35&param5=56" may be organized as:

```
<sku lang="A" year="2004">
    <teleport tName="telurl" domain="msnbc.msn.com" path="/climate/zone.aspx">
        <parameter type="1" inName="param1" outName="param2"/>
        <parameter type="1" inName="param3" outName="param4" value="25"/>
        <parameter type="2" inName="param5"/>
        <parameter type="3" static="param25=5¶m26=6"/>
    </teleport>
    <teleport tName="answerlab" domain="enc . . . >
    .
    .
    .
</sku>
```

In the exemplary teleport mapping structure 300, stock keeping units are delimited by the strings "<sku lang . . . >" and "</sku>," where "<sku lang . . . >" indicates the start of a stock keeping unit and "</sku>" indicates the end of a stock keeping unit. The teleport entries contained in a stock keeping unit appear between the strings "<sku lang . . . >" and "</sku>," and each teleport entry is delimited by the strings "<teleport . . . >" and "</teleport>."

With continuing reference to exemplary teleport mapping structure 300, sku component 302 is designated by the strings "lang=" and "year=" and identifies this stock keeping unit by the language corresponding to the single character language code "A" and the year "2004." The first teleport entry 304 is designated by the start string "<teleport . . . >," and is composed of:

tName attribute 306 designated by the string "tName=" and specifying the name of the first teleport entry 304 as "telurl";

domain attribute 308 designated by the string "domain=" and specifying the destination domain as "msnbc.msn.com";

path attribute 310 designated by the string "path=" and specifying "/climate/zone.aspx" as the path in the destination domain; and five parameter directives 312, where each parameter directive 312 is designated by the string "<parameter . . . />."

Each teleport entry 304 may have zero, one or more parameter directives 312. The collection of parameter directives 312, including the absence of parameter directive 312, functions as rules for parsing and translating the parameters in a teleport URL. When present, a parameter directive 312 is composed of a parameter type indicator (designated by the string "type=") that specifies a type for the parameter directive 312, an inName attribute (designated by the string "inName=") that specifies a string representing the name of a parameter in a teleport URL, an outName attribute (designated by the string "outName=") that specifies a string used to rename a parameter in a teleport URL, a value attribute (designated by the string "value=") that specifies a string representing a value for the renamed parameter, and a static attribute (designated by the string "static=") that specifies a static string that is to be added to the destination URL string. The static string may be a single name/value pair or a multiple number of name/value pairs, each properly delimited by the "&" character. Depending on the type of parameter directive 312, one or more of the attributes may not be present.

In one embodiment, a parameter type indicator may either be "1," "2" or "3." Parameter type "1" is used to rename a parameter in the teleport URL to a different name in the destination URL. For example, if a parameter name in a teleport URL string matches a string specified by an inName attribute and the parameter type is "1," then the parameter name is substituted with the string specified by an outName attribute in the destination URL string, and any value attribute that is present is added to the destination URL string.

Parameter type "2" is used to ignore or filter a parameter in the teleport URL. For example, if a parameter name in a teleport URL string matches a string specified by an inName attribute and the parameter type is "2," then the parameter name is ignored. Stated another way, the parameter and its corresponding value in the teleport URL string is not copied to the destination URL string.

Parameter type "3" is used to add a static string to the destination URL string. For example, if a parameter type "3" parameter directive 312 is present, then the string specified by the static attribute is added to the destination URL string.

In one embodiment, teleport server 102 may provide a mapping of domain names and their aliases to facilitate the use of aliases by the teleport entries 304 and, in particular, domain parameters 308 in teleport entries 304. For example, a mapping of full domain names and their aliases can be specified in a repository, such as the file "web.config," on teleport server 102. Teleport mapping component 110 can then access the repository containing the domain alias mapping data to substitute aliases with their full domain names when generating destination URL strings.

The teleport URL and the teleport mapping data and directives have been described in terms of teleport URL structure 200 and teleport mapping structure 300, respectively, only for ease of explanation, and one of ordinary skill in the art will appreciate that the teleport URL and teleport mapping data are not limited to these structures. Moreover, the exemplary teleport URL and the exemplary teleport mapping data and directives have been illustrated as being implemented using XML. It will be appreciated that other programming languages, such as, by way of example and not limitation, scripting languages, mark-up languages, compiled programming languages, and the like, may be used to implement all or parts of the teleport URL and the teleport mapping data and directives.

To more fully illustrate its implementation and operation, teleport server 102 is described in conjunction with an example. In particular, the example describes the processing of the aforementioned exemplary teleport URL using the aforementioned exemplary teleport mapping data and directives to generate a destination URL string. It will be appreciated that the embodiments of teleport server 102 may be used in circumstances that diverge significantly from these examples in various respects.

Figure 4:
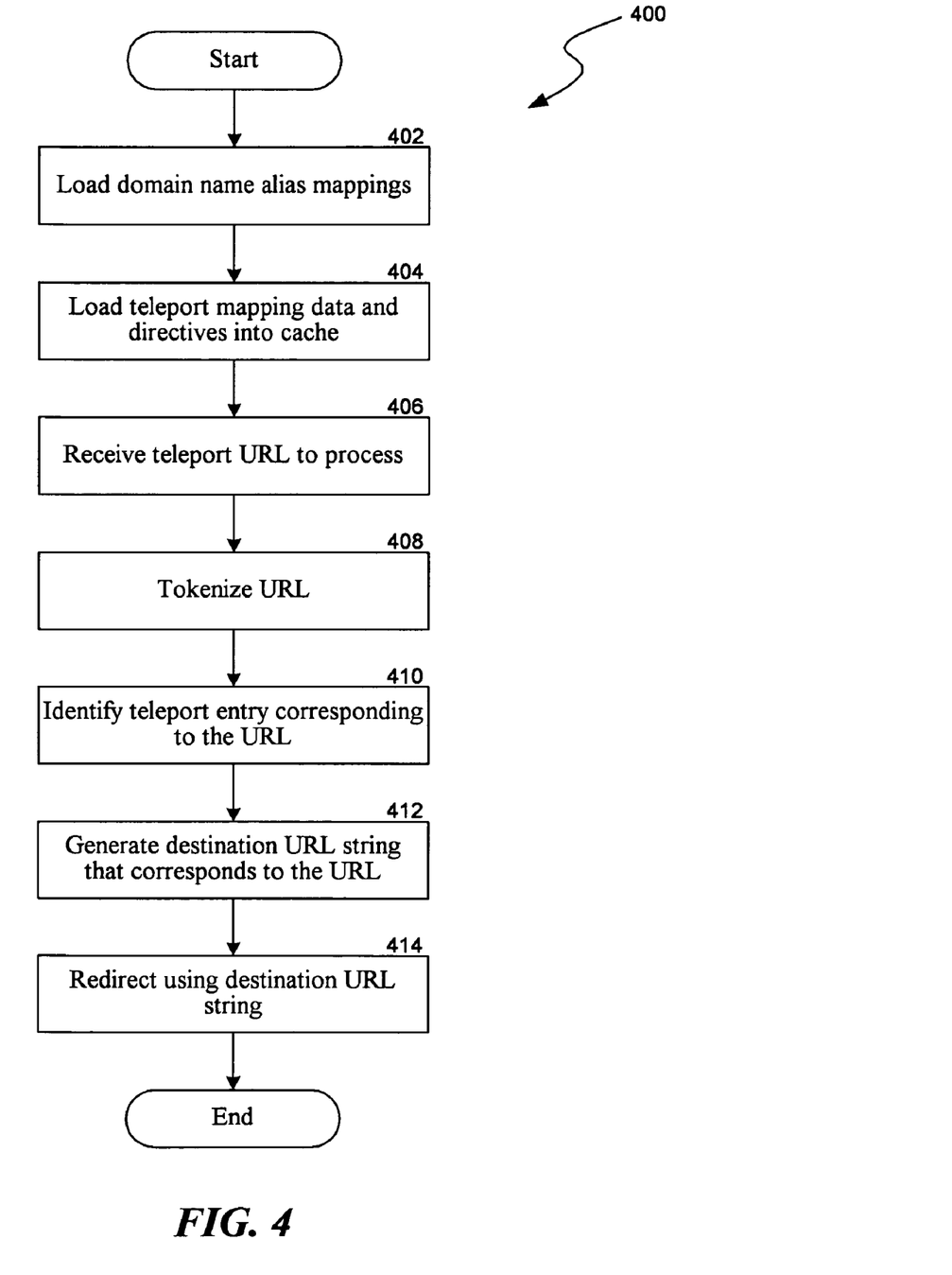
FIG. 4 illustrates a flow chart of an exemplary method by which a teleport server processes a teleport URL, according to one embodiment.

FIG. 4 illustrates a flow chart of an exemplary method 400 by which teleport server 102 processes a teleport URL, according to one embodiment. In particular, method 400 illustrates the processing of an input teleport URL string by teleport mapping component 110 to generate a destination URL string. Beginning at a start step, teleport mapping component 110 loads domain name alias mappings, for example, from non-volatile memory (e.g., hard drive) to cache memory at step 402. At step 404, teleport mapping component 110 loads the teleport mapping data and directives from, for example, teleport database 112, into cache memory.

In one embodiment, teleport mapping component 110 may periodically check to determine if the domain name alias mappings or the teleport mapping data and directives have undergone a change (i.e., an update). If there has been a change, teleport mapping component 110 can load the new (i.e., changed) data into cache memory.

At step 406, teleport mapping component 110 receives a teleport URL to process. At step 408, the teleport mapping component 110 tokenizes the input teleport URL. For example, web server component 108 may have previously received a URL from a user on one of client computers 104, and may have determined that the received URL is a teleport URL and passed it to teleport mapping component 110 for processing. In one embodiment, teleport mapping component 110 tokenizes the input teleport URL by parsing the teleport URL string and identifying the attributes and their corresponding values (i.e., language, year, tName, parameter name and value pair, etc.).

At step 410, teleport mapping component 110 identifies a teleport entry that corresponds to the teleport URL. In one embodiment, the correct teleport entry is identified and selected using the language, year and tName attributes from the input teleport URL string. At step 412, teleport mapping component 110 processes the attributes of the input teleport URL string against the parameter directives in the identified teleport entry to generate a destination URL string that corresponds to the input teleport URL.

Figure 5:
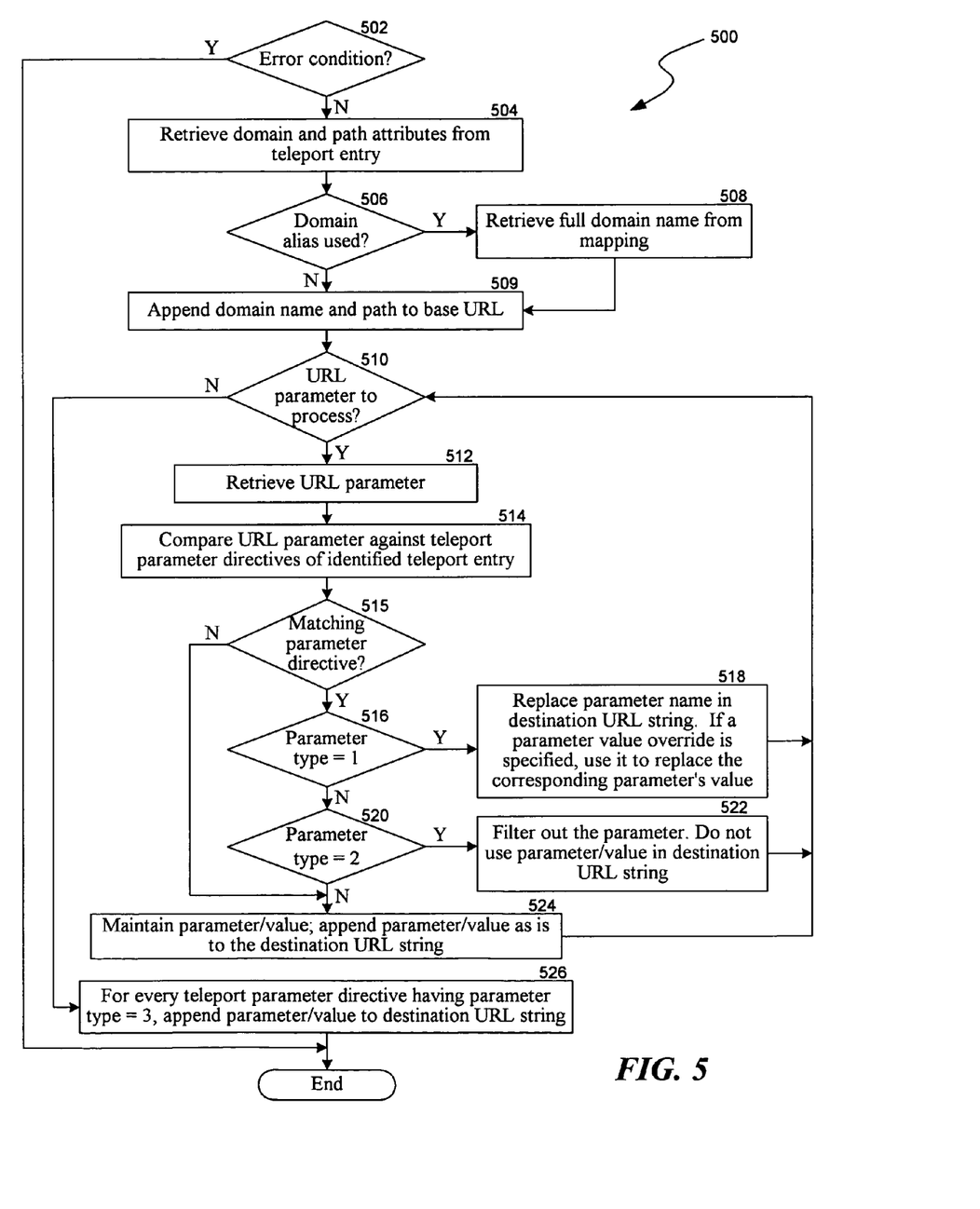
FIG. 5 illustrates a flow chart of an exemplary method by which a teleport mapping component generates a destination URL string from an input teleport URL string, according to one embodiment.

FIG. 5 illustrates a flow chart of an exemplary method 500 by which teleport mapping component 110 generates a destination URL string from an input teleport URL string, according to one embodiment. At step 502, teleport mapping component 110 determines if an error condition occurred. For example, an error may have occurred in trying to find a correct teleport entry or with the contents of the teleport entry.

Figure 6:
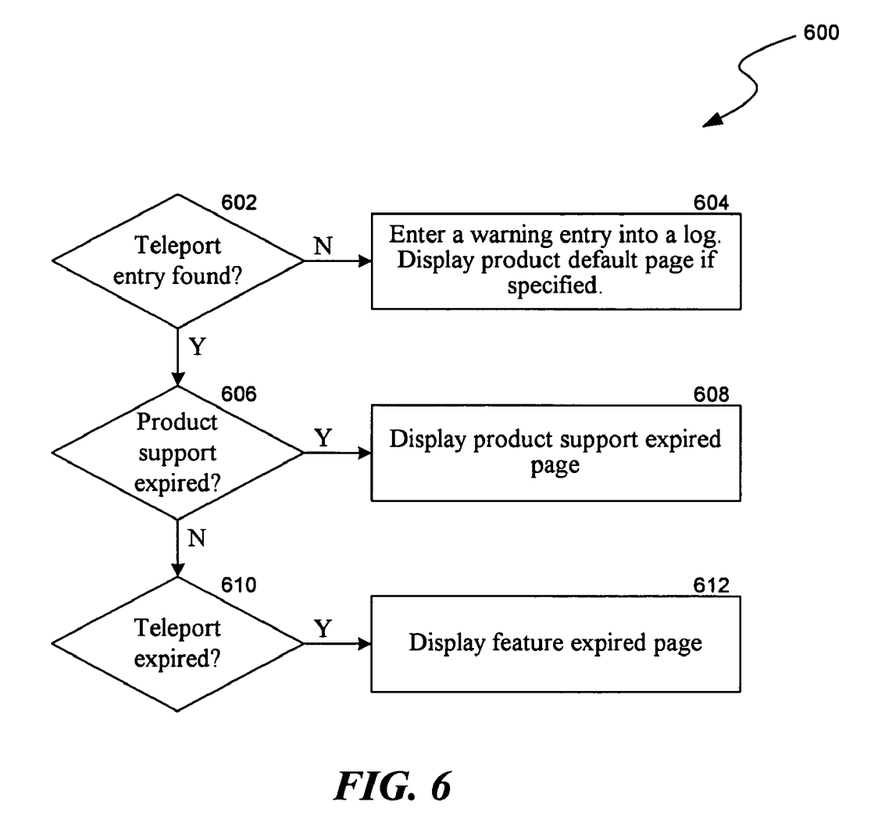
FIG. 6 illustrates a flow chart of an exemplary method by which the teleport mapping component determines if an error condition occurred while processing an input teleport URL string, according to one embodiment.

FIG. 6 illustrates a flow chart of an exemplary method 600 by which teleport mapping component 110 determines if an error condition occurred while processing an input teleport URL string, according to one embodiment. At step 602, teleport mapping component 110 checks to determine if a correct teleport entry for the input teleport URL string was found. If a correct teleport entry was not found, teleport mapping component 110 records the occurrence of the error condition at step 604. For example, teleport mapping component 110 can enter a warning or error entry into a log. If a default page is specified, teleport mapping component 110 can transmit to client computer 104 the default page for display on client computer 104.

If, at step 602, it is determined that a correct teleport entry is found, teleport mapping component 110 checks to determine if product support for the product through which the input teleport URL was transmitted has expired at step 606. For example, the teleport entry may include an entry that indicates that the support for the product associated with the input teleport URL has expired. If support for the product has expired, teleport mapping component 110 can transmit to client computer 104 a product support expired page for display on client compute 104 at step 608.

If, at step 606, it is determined that support for the product has not expired, teleport mapping component 110 checks to determine if the teleport (i.e., feature) has expired at step 610. For example, the teleport entry may include an entry that indicates that the teleport URLs corresponding to a particular product version based on SKUs have expired. If the teleport has expired, teleport mapping component 110 can transmit to client computer 104 a feature expired page for display on client computer 104 at step 612.

It will be appreciated that teleport mapping component 110 can check for additional error conditions than those specified above. Moreover, teleport mapping component 110 may also take additional and/or other actions than the actions specified above upon the detection of an error condition.

Referring again to FIG. 5, if, at step 502, an error condition did not occur, then teleport mapping component 110 retrieves the domain and path attributes from the identified teleport entry at step 504.

At step 506, teleport mapping component 110 checks to determine if a domain alias is used. If an alias is being used, teleport mapping component 110 retrieves the full domain name corresponding to the alias in the identified teleport entry at step 508. For example, one possible alias may be "enc" for the domain name "encarta.msn.com." If the alias "enc" is present in the identified teleport entry, teleport mapping component 110 retrieves full domain name "encarta.msn.com" corresponding to the "enc" alias and appends it to the destination URL string at step 509. For example, in the exemplary mapping data and directives, the domain is "msnbc.msn.com" and the path is "/climate/zone.aspx." These two strings are appended to a base destination URL string of "http://" to generate a destination URL string "http://msnbc.msn.com/climate/zone.aspx."

If, at step 506, teleport mapping component 110 determines that an alias is not being used, the full domain name is appended as is to the destination URL string at step 509. The teleport mapping component 110 then checks to determine if there is an input teleport URL parameter to process at step 510. If there is an input teleport URL parameter to process, teleport mapping component 110 retrieves the URL parameter from the input teleport URL string at step 512.

Continuing the example, the first URL parameter to process in the exemplary teleport URL "http://domainname.com/teleport/teleport.aspx?Lang=A&Year=2004&tName=telurl&param1=45&param3=35&param5=56" is the string "param1=45."

At step 514, teleport mapping component 110 compares the current teleport URL parameter against the teleport parameter directives of the identified teleport entry. Teleport mapping component 110 compares the name of the current teleport URL parameter against the inName attribute of the teleport parameter directives of the identified teleport entry.

At step 515, teleport mapping component 110 determines whether there is a parameter directive matching the name of the current teleport URL parameter. If there is a matching parameter directive, teleport mapping component 110 checks to determine if the parameter type of the matching parameter directive is "1" at step 516.

If there is a matching parameter directive (step 515) and its parameter type is "1" (step 516), then, at step 518, teleport mapping component 110 replaces the name of the current teleport URL parameter in the destination URL string with the outName attribute of the matching parameter directive. If a parameter value override is present in the matching parameter directive (i.e., a "value" attribute is specified in the matching parameter directive), the value currently in the destination URL string is replaced with the value specified by the value attribute in the matching parameter directive.

Continuing the example, the current teleport URL parameter "param1=45" matches the teleport parameter directive "<parameter type="1" inName="param1" outName="param2"/>." The name of the current teleport URL parameter, "param1," matches the inName attribute, "param1," of the teleport parameter directive, and the parameter type of the parameter is "1." A value attribute is not specified in the teleport parameter directive, thus, there is no parameter value override and the current parameter value "45" is maintained in the destination URL string. Therefore, the name of the current teleport URL parameter, "param1," is replaced with the string specified by the outName attribute, "param2," and added to the destination URL to generate "http://msnbc.msn.com/climate/zone.aspx?param2=45".

If, at step 516, the parameter type was not "1," then teleport mapping component 110 checks to determine if the parameter type of the matching parameter directive is "2" at step 520. If there is a matching parameter directive (step 515) and its parameter type is "2" (step 520), then, at step 522, teleport mapping component 110 filters out the current teleport URL parameter from the destination URL string. Stated another way, the current teleport URL parameter and value pair is not added to the destination URL string.

If, at step 515, a matching parameter directive was not found, or there was a matching parameter directive but its parameter type was not "1" (step 516) or "2" (step 520), then teleport mapping component 110 appends URL parameter/value (step 524) to the destination URL string. This functions as a "pass-through" parameter directive since the appended URL parameter is maintained in the destination URL string.

In an alternative embodiment, if, at step 515, a matching parameter directive was not found, then teleport mapping component 110 does not add the current teleport URL parameter and value pair to the destination URL string. Here, teleport mapping component 110 enforces a strong mapping of the teleport URL parameters to maintain a secure environment by requiring a teleport URL parameter to have a matching parameter directive, otherwise, the teleport URL parameter is dropped.

Subsequent to steps 518, 522 and 524, teleport mapping component 110 returns to step 510 and checks to determine if there is another input teleport URL parameter to process. Teleport mapping component 110 processes each parameter in the input teleport URL in this manner (i.e., steps 510 to 524).

Continuing the example, teleport mapping component 110 next processes the URL parameter "param3=35" by replacing it with "param4=25" to generate the destination URL string "http://msnbc.msn.com/climate/zone.aspx?param2=45&param4=25." Teleport mapping component 110 next processes the URL parameter "param5=56" by filtering (i.e., removing) it from the input teleport URL string. Thus, the destination URL string generated is "http://msnbc.msn.com/climate/zone.aspx?param2=45¶m4=25."

If, at step 510, teleport mapping component 110 determines that there are no input teleport URL parameters to process (i.e., all input teleport URL parameters have been processed), then, teleport mapping component 110 appends the static attribute in the identified teleport entry to the destination URL string at step 526. In particular, for every teleport parameter directive having a parameter type of "3" in the identified teleport entry, teleport mapping component 110 appends the string specified by the static attribute to the destination URL string.

Continuing the example, the string "param25=5¶m26=6," which is specified by the static attribute is appended to the destination URL string. Thus, teleport mapping component 110 generates a final destination URL string of "http://msnbc.msn.com/climate/zone.aspx?param2=45&param4=25&param25=5&param26=6" from the exemplary input teleport URL and the exemplary teleport mapping data and directives.

Referring again to FIG. 4, subsequent to generating a destination URL string (step 412), teleport mapping component 110 redirects using the destination URL string at step 414, and proceeds to an end step. In one embodiment, teleport mapping component 110 returns the generated destination URL string to web server component 108, and web server component 108 redirects the originator of the corresponding teleport URL (i.e., the client computer that transmitted the teleport URL) using the destination URL string.

Those of ordinary skill in the art will appreciate that, for this and other methods disclosed herein, the functions performed in the exemplary flow charts may be implemented in differing order. Furthermore, the steps outlined in the flow charts are only exemplary, and some of the steps may be optional, combined into fewer steps, or expanded into additional steps without detracting from the essence of the invention.

Figure 7:
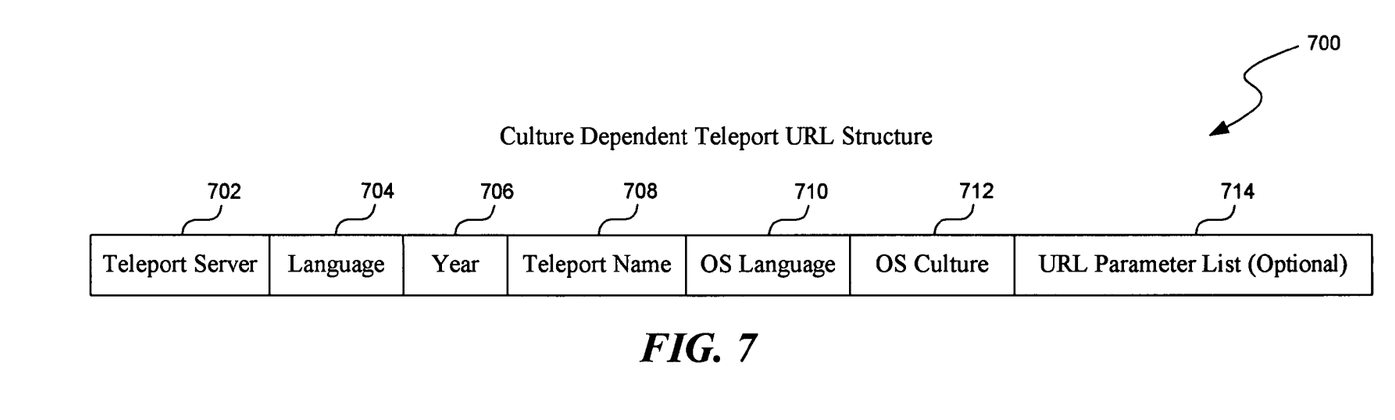
FIG. 7 illustrates an exemplary culture dependent teleport URL structure, according to one embodiment.

FIG. 7 illustrates a culture dependent teleport URL structure 700, according to one embodiment. In particular, culture dependent teleport URL structure 700 defines the structure of a culture dependent teleport URL that is used to connect to teleport server 102. A culture dependent teleport URL includes a designation of a user's language and/or culture. The addressed web server can use the language and/or culture designation to deliver a requested resource that is appropriate for the user's language and/or culture.

By way of example, in FIG. 7, culture dependent teleport URL structure 700 is illustrated as comprising a teleport server attribute 702, a language attribute 704, a year attribute 706, a teleport name attribute 708, an OS language attribute 710, an OS culture attribute 712, and an optional URL parameter list 714. Attributes 702, 704, 706 and 708 and list 714 are similar to attributes 202, 204, 206 and 208 and list 210, respectively, of teleport URL structure 200 previously described.

OS language attribute 710 specifies the current language being utilized on a client computer 104 by a user. OS culture attribute 712 specifies the current culture that is being employed by client computer 104. In one embodiment, OS language attribute 710 and OS culture attribute 712 represent the high and low words of the LangID attribute, respectively, from the operating system executing on a user's client computer 104. For example, a web client executing on a user's client computer 104 can add the OS language attribute 710 and OS culture attribute 712 to a URL before transmitting the URL to a web server. In another example, a program executing on a user's client computer 104 can add OS language attribute 710 and OS culture attribute 712 to a teleport URL that is included in a fixed-media product before transmitting the teleport URL.

Figure 8:
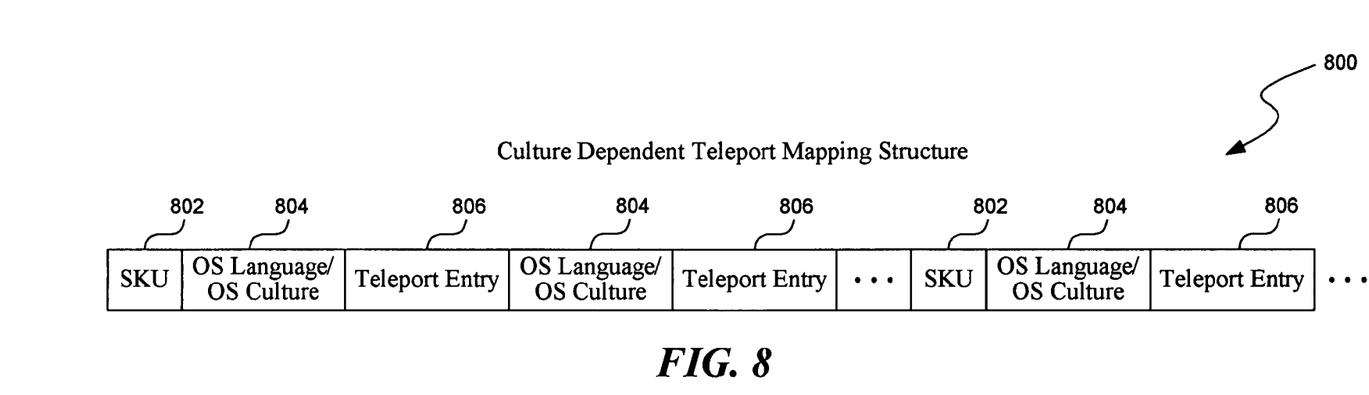
FIG. 8 illustrates an exemplary culture dependent teleport mapping structure, according to one embodiment.

FIG. 8 illustrates an exemplary culture dependent teleport mapping structure 800, according to one embodiment. In particular, culture dependent teleport mapping structure 800 defines the structure of culture dependent teleport entries, which is used to generate a destination URL string that is appropriate for the language and/or culture specified in an input culture dependent teleport URL string. In one embodiment, culture dependent teleport mapping structure 800 is developed using XML in a substantially similar manner as teleport mapping structure 300 previously described.

By way of example, culture dependent teleport mapping structure 800 is illustrated as comprising one or more SKU components 802. Each SKU component 802 comprises one or more OS language/OS culture attributes 804, and each OS language/OS culture attribute 804 includes at least one teleport entry component 806. SKU component 802 and teleport entry component 806 are similar to SKU component 302 and teleport entry component 304, respectively, of teleport mapping structure 300 previously discussed.

Similar to SKU 802, OS language/OS culture attribute 804 functions as a container that holds one or more teleport entry components 806. OS language/OS culture attribute 804 specifies the OS language and/or OS culture of the teleport entries 806 included or contained in the container designated by the OS language/OS culture attribute 804. An exemplary culture dependent teleport mapping structure 800 may be organized as:

```
<sku lang="abc" year="yyyy">
    <os osLang="123" osCulture="123">
        <teleport tName="foo" domain="abc" path="abc">
            <parameter type="2" static="param25=5"/>
        </teleport>
    <os>
    <os osLang="0" osCulture="0">
        <teleport tName="foo" domain="abc" path="abc">
            <parametertype="2" inName="param5"/>
        <teleport>
    <os>
<sku>
```

In the exemplary culture dependent teleport mapping structure 800, OS language/OS culture attribute 804 is indicated by the tag <os osLang="value" osCulture="value">, and the teleport entries 806 for a particular OS language/OS culture attribute 804 appear below the tag. In one embodiment, values of "0" for the osLang and osCulture attributes in OS language/OS culture attribute 804 represent the default values for OS language/OS culture attribute 804, and contain teleport entries 806 that are not dependent upon the user's client computer 104 language and/or culture. In the above exemplary culture dependent teleport mapping structure 800, the teleport entry appearing below the tag <os osLang="0" osCulture="0"> is a default teleport entry that is not dependent upon the user's language and/or culture.

Figure 9:
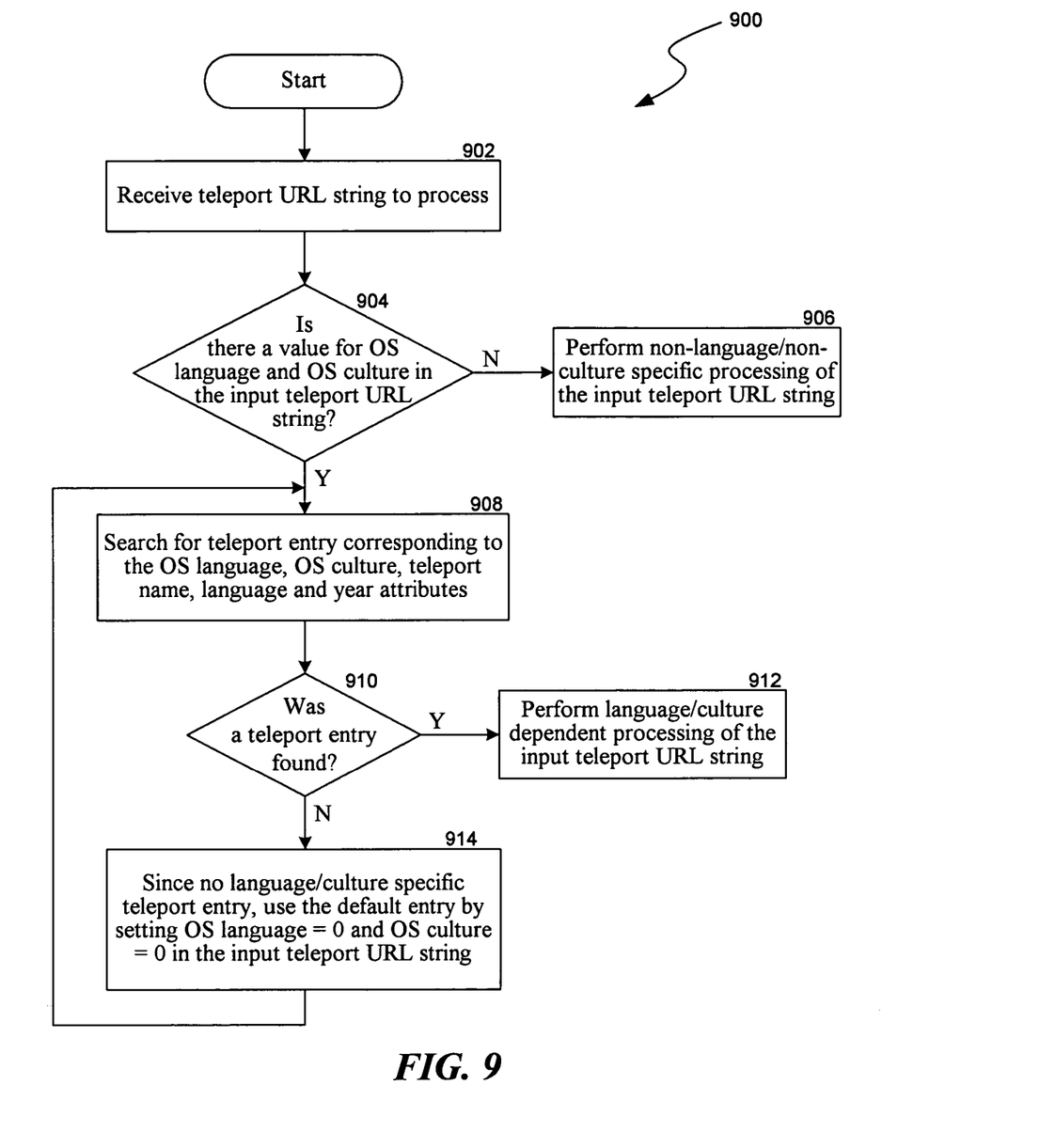
FIG. 9 illustrates a flow chart of an exemplary method by which a teleport server processes a culture dependent teleport URL, according to one embodiment.

FIG. 9 illustrates a flow chart of an exemplary method 900 by which teleport server 102 processes a culture dependent teleport URL, according to one embodiment. In particular, method 900 illustrates the processing of an input culture dependent teleport URL string by teleport mapping component 110 to generate a destination URL string that is dependent upon a user's language and/or culture as specified in the input culture dependent teleport URL string.

Beginning at a start step, teleport mapping component 110 receives a teleport URL string to process at step 902. For example, web server component 108 may pass the teleport URL string to teleport mapping component 110 for culture dependent processing. At step 904, teleport mapping component 110 checks the input teleport URL string for a value for OS language and OS culture attributes. Stated differently, teleport mapping component 110 checks to determine if the input teleport URL string is a language dependent teleport URL.

If there is no value for OS language and OS culture attributes, teleport mapping component 110 performs non-language/non-culture specific processing of the input teleport URL string at step 906. In one embodiment, teleport mapping component 110 substantially performs exemplary method 400 previously discussed to process the non-language specific teleport URL.

If, at step 904, a value for OS language and OS culture attributes were present in the input teleport URL string, then, teleport mapping component 110 searches for a teleport entry that corresponds to the input culture dependent teleport URL string at step 908. More specifically, teleport mapping component 110 searches for a teleport entry having the same OS language, OS culture, teleport name, language and year attribute values as those present in the input culture dependent teleport URL string.

At step 910, teleport mapping component 110 checks to determine if a matching teleport entry was found. If a matching teleport entry was found, teleport mapping component 110 performs language/culture dependent processing of the input culture dependent teleport URL string using the matching teleport entry at step 912. In one embodiment, teleport mapping component 110 substantially performs exemplary method 400 utilizing the matching teleport entry found at step 908 to perform the culture dependent processing of the input teleport URL string.

If, at step 910, a matching teleport entry was not found, teleport mapping component 110 uses a default teleport entry by setting the OS language attribute and OS culture attribute in the input teleport URL string to a value of "0" at step 914. Subsequent to setting the OS language and OS culture attributes of the input teleport URL to "0," teleport mapping component 110 returns to step 908 to search for a teleport entry that corresponds to the input culture dependent teleport URL string having "0" values for OS language and OS culture. Subsequently, if a matching teleport entry is not found, teleport mapping component 110 may generate an error condition or show the product default page if any is specified. For example, teleport mapping component 110 can return an error message to web server component 108.

In another embodiment, teleport mapping component 110 may not perform non-language specific processing of the input teleport URL string at step 906. Rather, if a value for OS language and OS culture attributes are not present in the input teleport URL string (step 904), teleport mapping component 110 may provide default values for the OS language and OS culture attributes (i.e., OS language attribute and OS culture attribute having a value "0") and search for a default teleport entry.

In still another embodiment, web server component 108 may use the OS language and OS culture attribute values to provide unsolicited content that is appropriate for a user's language and/or culture. For example, teleport mapping component 110 can return the OS language and OS culture attribute values along with the destination URL string to web server component 108. Subsequently, web server component 108 can use the OS language and OS culture attribute values to provide content, such as, by way of example and not limitation, advertisements, surveys, information pages, and the like, that is targeted for the language and/or culture. Web server component 108 may provide the OS language and OS culture information to one or more other content providers, who, in turn, use the information to deliver targeted content.

Even though the culture dependent feature was described in conjunction with a teleport URL, it will be appreciated that the culture dependent feature is not limited to use in a teleport URL. For example, the culture dependent feature can be readily applied to standard URLs. In this instance, a web server appropriate to process the URL can perform the culture dependent processing substantially similar to exemplary method 900.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computing system for processing a URL comprising:

receiving from a computing device an input URL;

providing a plurality of teleport entries, each teleport entry having a parameter directive, some of the teleport entries including a designation of a language and/or culture;

determining whether the input URL includes a designation of a language and/or culture;

responsive to determining that the input URL does not include a designation of a language and/or culture, generating a destination URL that identifies content that is addressed by the input URL by identifying a teleport entry that matches the input URL and renaming a parameter of the input URL to a different name in the destination URL in accordance with the parameter directive of the matching teleport entry;

responsive to determining that the input URL includes a designation of a language and/or culture:

determining whether there is content that is addressed by the input URL and that is dependent on the language and/or culture designation in the input URL; and responsive to determining that there is content that is addressed by the input URL and that is dependent on the language and/or culture designation in the input URL, generating a destination URL that identifies this content by identifying a teleport entry that matches the input URL along with its language and/or culture designation and renaming a parameter of the input URL to a different name in the destination URL in accordance with the parameter directive of the matching teleport entry; and sending the generated destination URL to the computing device with an indication that the destination URL is a redirection of the input URL.

2. The method of claim 1 further comprising, responsive to determining that there does not exist content that is addressed by the input URL and that is dependent on the language and/or culture designation in the input URL, providing content that is not dependent on the language and/or culture designation in the input URL.

3. The method of claim 1, wherein the URL is a teleport URL.

4. The method of claim 1, wherein the designation indicates a culture that is being employed by an operating system presently executing on a computer on which the input URL originated.

5. The method of claim 1, wherein the designation indicates a language of an operating system presently executing on a computer on which the input URL originated.

6. A computer-readable storage medium containing instructions for controlling a computing system to process a URL comprising:

receiving from a computing device an input URL;

providing a plurality of teleport entries, each teleport entry having a parameter directive, some of the teleport entries including a designation of a language and/or culture;

determining whether the input URL includes a designation of a language and/or culture;

responsive to determining that the input URL does not include a designation of a language and/or culture, generating a destination URL that identifies content that is addressed by the input URL by identifying a teleport entry that matches the input URL and renaming a parameter of the input URL to a different name in the destination URL in accordance with the parameter directive of the matching teleport entry;

responsive to determining that the input URL includes a designation of a language and/or culture:

determining whether there is content that is addressed by the input URL and that is dependent on the language and/or culture designation in the input URL; and responsive to determining that there is content that is addressed by the input URL and that is dependent on the language and/or culture designation in the input URL, generating a destination URL that identifies this content by identifying a teleport entry that matches the input URL along with its language and/or culture designation and renaming a parameter of the input URL to a different name in the destination URL in accordance with the parameter directive of the matching teleport entry; and sending the generated destination URL to the computing device with an indication that the destination URL is a redirection of the input URL.

7. The computer-readable storage medium of claim 6 further comprising, responsive to determining that there does not exist content that is addressed by the input URL and that is dependent on the language and/or culture designation in the input URL, providing content that is not dependent on the language and/or culture designation in the input URL.

8. The computer-readable storage medium of claim 6, wherein the URL is a teleport URL.

9. The computer-readable storage medium of claim 6, wherein the designation indicates a culture that is being employed by an operating system presently executing on a computer on which the input URL originated.

10. The computer-readable storage medium of claim 6, wherein the designation indicates a language of an operating system presently executing on a computer on which the input URL originated.

11. A computing system with a central processing unit and a memory for processing a URL comprising:

a component that receives from a computing device an input URL;

a component that provides a plurality of teleport entries, each teleport entry having a parameter directive, some of the teleport entries including a designation of a language and/or culture;

a component that determines whether the input URL includes a designation of a language and/or culture;

a component that, responsive to determining that the input URL does not include a designation of a language and/or culture, generates a destination URL that identifies content that is addressed by the input URL by identifying a teleport entry that matches the input URL and renaming a parameter of the input URL to a different name in the destination URL in accordance with the parameter directive of the matching teleport entry;

a component that, responsive to determining that the input URL includes a designation of a language and/or culture, determines whether there is content that is addressed by the input URL and that is dependent on the language and/or culture designation in the input URL; and responsive to determining that there is content that is addressed by the input URL and that is dependent on the language and/or culture designation in the input URL, generates a destination URL that identifies this content by identifying a teleport entry that matches the input URL along with its language and/or culture designation and renaming a parameter of the input URL to a different name in the destination URL in accordance with the parameter directive of the matching teleport entry; and a component that sends the generated destination URL to the computing device with an indication that the destination URL is a redirection of the input URL.

12. The computing system of claim 11 further comprising a component that, responsive to determining that there does not exist content that is addressed by the input URL and that is dependent on the language and/or culture designation in the input URL, provides content that is not dependent on the language and/or culture designation in the input URL.

13. The computing system of claim 11, wherein the URL is a teleport URL.

14. The computing system of claim 11, wherein the designation indicates a culture that is being employed by an operating system presently executing on a computer on which the input URL originated.

15. The computing system of claim 11, wherein the designation indicates a language of an operating system presently executing on a computer on which the input URL originated.

* * * * *